Aug. 26, 1924.
O. L. HERRON
VEHICLE TOP
1,505,955
Filed May 15, 1920    3 Sheets-Sheet 3
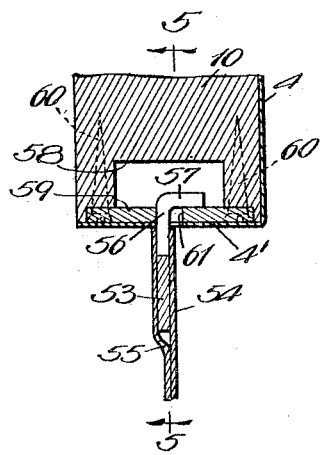
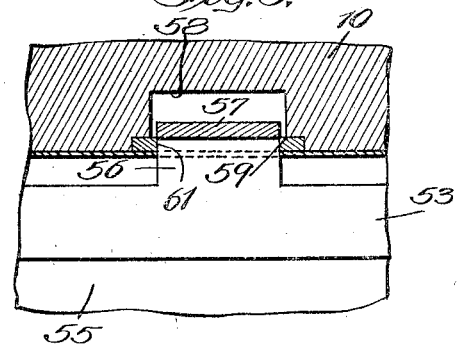
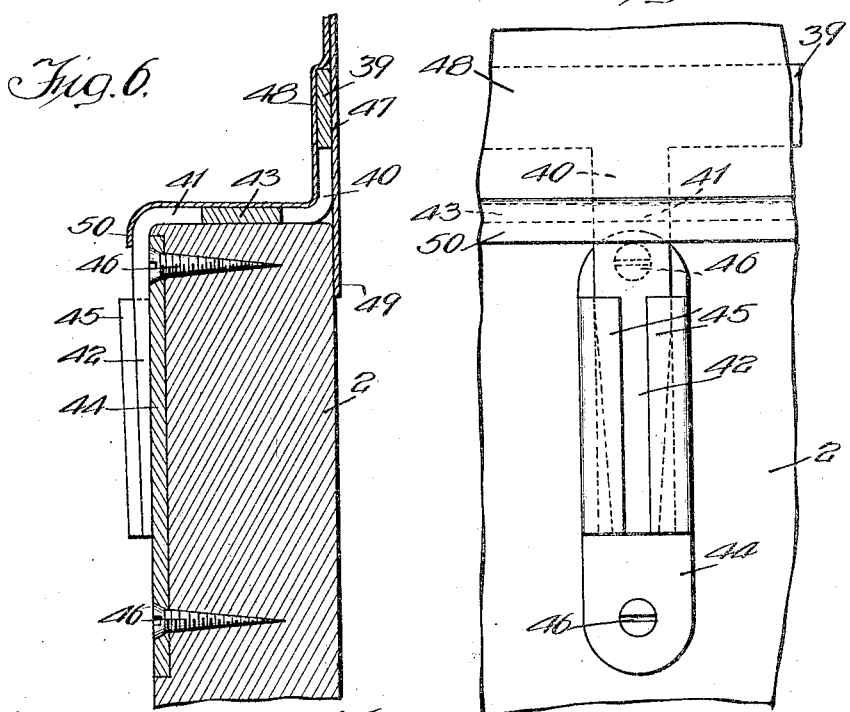
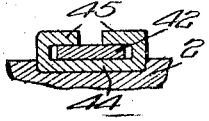

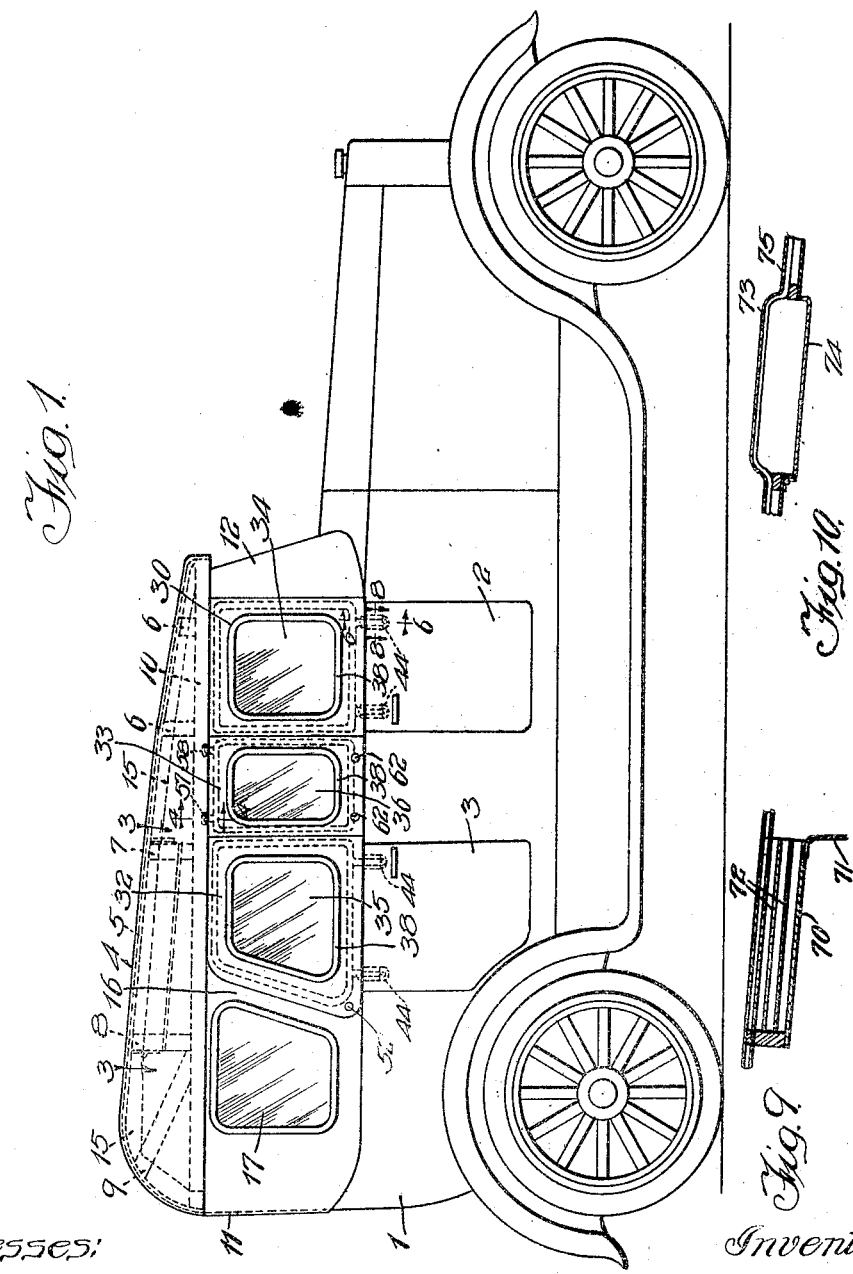

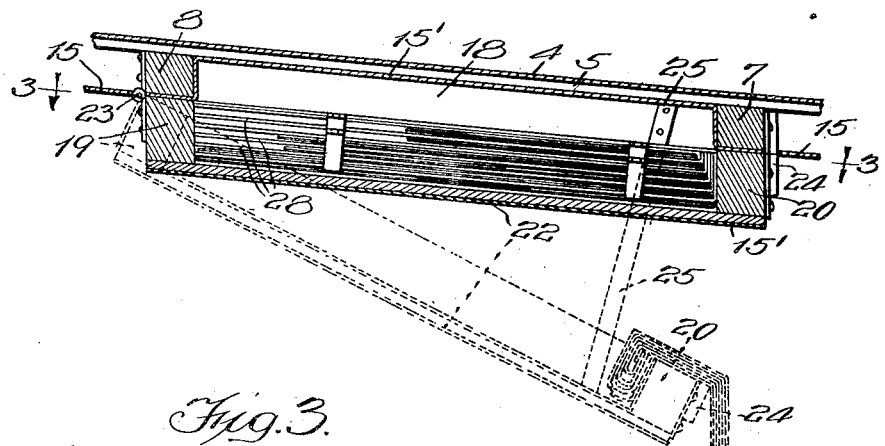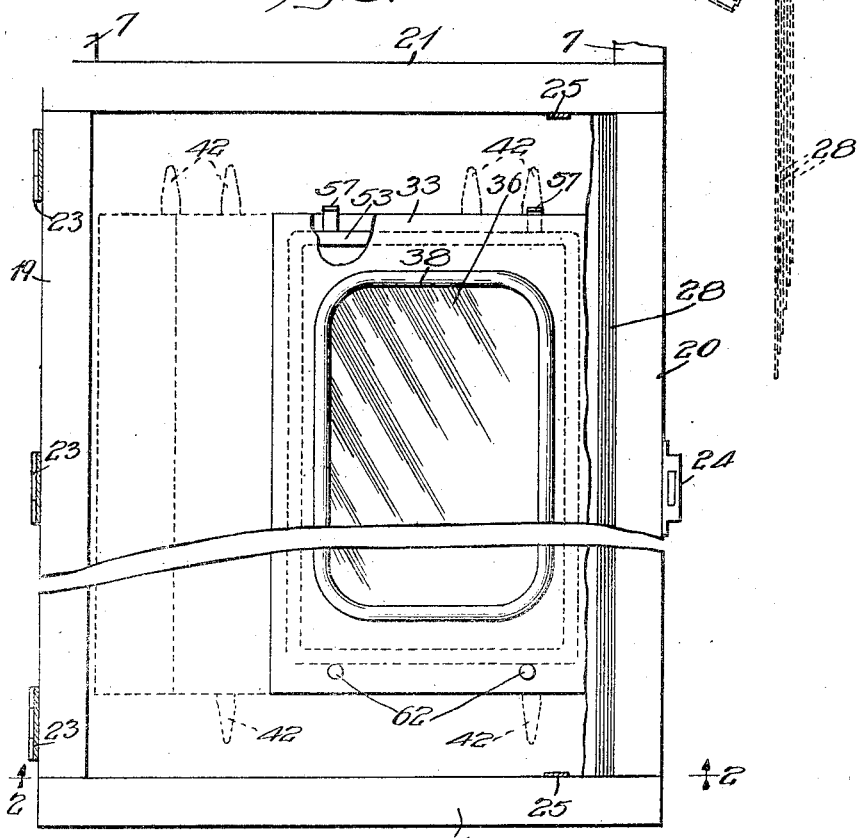

Patented Aug. 26, 1924.

1,505,955

UNITED STATES PATENT OFFICE.

OLLIE L. HERRON, OF CHICAGO, ILLINOIS.

VEHICLE TOP.

Application filed May 15, 1920. Serial No. 381,699.

*To all whom it may concern:*

Be it known that I, OLLIE L. HERRON, a citizen of the United States, residing at Chicago, in the county of Cook and State of Illinois, have invented certain new and useful Improvements in Vehicle Tops, of which the following is a description.

My invention belongs to that general class of devices known as vehicle tops, and relates to a top particularly designed for use on an automobile, and suitable for all seasons of the year. The invention has among its objects the production of a top of the kind described that is simple, convenient, ornamental, durable, efficient and satisfactory for use wherever found applicable. It has particularly as an object the production of an improved top provided with convenient detachable side walls or inclosures, and constructed to conveniently carry said inclosures when the same are not in use. Many other objects and advantages of the construction herein shown and described will be obvious to those skilled in the art from the disclosure herein made.

To this end my invention consists in the novel construction, arrangement and combination of parts herein shown and described, and more particularly pointed out in the claim.

In the drawings, wherein like reference characters indicate like or corresponding parts, Figure 1 is a side elevation of an automobile equipped with the preferred form of my improved top;

Figure 2 is a sectional view taken substantially on line 2—2 of Figure 3;

Figure 3 is a sectional view taken substantially on line 3—3 of Figure 2, or 3—3 of Figure 1;

Figure 4 is a sectional view taken substantially on line 4—4 of Figure 1;

Figure 5 is a sectional view taken substantially on line 5—5 of Figure 4;

Figure 6 is a sectional view taken substantially on line 6—6 of Figure 1;

Figure 7 is a view in elevation of the parts shown in Figure 6;

Figure 8 is a sectional view taken substantially on line 8—8 of Figure 1;

Figure 9 is a sectional view illustrating a modified form of container; and

Figure 10 is a similar view of another form.

Referring to the drawings, in which is illustrated an automobile, the same representing any desired type or style, 1 is a body which is shown provided with side doors 2 and 3, it being understood that the opposite side is generally substantially similar. Arranged on the body is a top which is preferably constructed of suitable frame work having the outer covering 4 arranged over it. I have illustrated the frame work consisting of the pieces 5 of suitable material extending from end to end over the top, and carried by the cross portions 6—6, 7, 8 and 9, which are carried by the side frames 10, the parts being formed to produce a desired style or design. The rear of the top is provided with and supported by the frame portion 11 carried at the rear of the body, the front end being mounted or secured to the wind shield (not shown in detail) at each side of which may be arranged the closure members 12.

The interior of the top shown is provided with a suitable lining 15 of fabric or the equivalent, covering the frame work, and presenting an attractive appearance. Before describing the detachable side enclosures, I shall first describe the storage container therefor, when the same are not in use, which container is substantially constructed into the top, and forms a portion thereof. Referring particularly to Figures 1, 2 and 3, I provide members 18 between the cross members 7 and 8, and which with said members form substantially a recess in the top. I also provide a cover which, in the construction shown, consists of a frame made up of portions 19, 20 and 21, and a botom portion 22, the same being suitably secured together so as to form a receptacle or box. The lining 15 may be set out so as to be flush with the bottom portion 22, if desired, this being immaterial in so far as the construction is concerned, except that the thickness of the top is to a certain extent increased. As shown, the closure or receptacle portion just described, is hinged at the rear edge as at 23, or otherwise secured to one of the parts, as shown, part 8, and a lock mechanism 24 secured to the other side for supporting the front edge and maintaining the side container closed except when desired to insert or remove the closures. In this manner the closure may be manipulated from the driver's seat. A strap, or the equivalent, 25 may be employed for limiting the opening movement of the cover portion, and to support the same during the insertion or removal of the side closures. I prefer to cover the inside of the container and the outside of the same as indicated at 15', with the same material as 15 so that an attractive and pleasing appearance is secured. If desired, a plurality of sheets of felt 28, or the equivalent, may be provided, the purpose of the same being more fully described hereafter.

Each of the detachable side closures preferably consists of a suitable frame covered with suitable substantially rigid endless material, and provided with transparent panels of glass or the like, glass being preferred, the construction being such that the detachable side parts may be quickly and easily applied, and quickly and easily removed at such times as may be desired. In the type of top shown, the back side portions of the top are formed with the frame portions 16 at each side, and suitable covering material for the same arranged thereover, within which are arranged transparent panes 17, of glass or the equivalent. As before mentioned, the portion 12 may be substantially permanently secured to the wind-shield and body, forming a portion of the permanent side enclosures. Arranged between the front part 12 and the rear portion 16 I provide panels or enclosures which, as shown, consist of part 30 arranged to be mounted above and carried by the door 2, and panel 32 by door 3. The intermediate portion 33, detachably connected to the body, is arranged between the two doors. As shown, these are provided with transparent panels 34, 35 and 36 respectively. These may be secured in place by the frame members 38, or their equivalents for the purpose.

Each of the enclosures 30 and 32 are preferably mounted on and carried by the door so as to open therewith and form substantially a part of the door structure when they are in place. Each is provided with a frame consisting of the portion 39, which is preferably extended as at 40—41, and provided with the portion 42, 43 being a portion connecting the two extensions which may be employed if desired. I have shown on the inside of each door a plurality of members or plates 44, constructed with the portions 45 arranged to embrace the extending parts 42. It may be mentioned that the parts are preferably made tapering, as indicated in Figures 6 and 7, so that when seated they will center the detachable door part and maintain it in its proper place and without rattling. The plates 44 may be secured to the doors by means of screws 46 or the equivalents for the purpose. Each door part is preferably covered on the inside and outside of the frame with a suitable covering 47 and 48, the same being sewed, stitched, riveted or otherwise secured together and reenforced and stiffened as desired. It will be noted by referring to Figure 6 that I prefer to extend cover 47 below the top of the doors, as indicated at 49, and extend the portion 48, as indicated at 50, so as to cover the top edge of the body door.

The panels 33 are also provided with the frame 53, which are covered on the inside and outside by the covering material 54 and 55. As most clearly shown in Figures 4 and 5, the frame is provided with extending parts 56, preferably bent over as indicated at 57. Each side frame part 10 is provided with the recess 58, over which is extended a plate 59, which may be secured in place by screws 60 or the equivalent. Plate 59 is provided with an opening 61 of a sufficient width to allow the extending portions 57 to be inserted into the recess 58, and the panel thence swung down into the position shown in Figures 1 and 4. The lower portion of the panel may be secured by fasteners 62, or the equivalent, to the body, and in this connection it may be mentioned that the extending portion of the panel 32 may be secured at 52 in a similar manner. I have not considered it necessary to illustrate these fasteners in detail, as any fastener on the market may be employed.

During inclement weather, the detachable sides or closures 30, 32 and 33 may be positioned as shown in Figure 1. When it is desired in nice weather or during the summer to drive without side walls, the various panels may be detached and placed in the container illustrated in Figures 2 and 3.

It will be noted that, notwithstanding the fact that the panels are of a substantial construction and are of some size, they may be stored in the top container, where they are out of the way, and where the glass or transparent panes will not be accidentally injured. The construction is so convenient that any one of the panels may be removed at will, and from the driver's seat, and inserted in the container and the same closed without the driver leaving his seat. The same may all be done in a moment's time and the enclosures may be as quickly removed from the container and applied to enclose the sides without the driver leaving the front seat. It should be noted that the various panels may be removed or applied without the use of tools, and without removing screws, bolts, or other fastening devices. The same may also be applied or removed without in any way inconveniencing or disturbing the occupants of the rear seat of the machine. The same closures serve for winter or summer. Obviously any one or more of the closures may be used without requiring the use of all at the same time. In placing the panels in the container, a piece of the felt 28, where the same is employed, is preferably turned over and in between adjacent panels so that not only do the same not rattle about in the container, but they also are protected from chafing and from breaking.

The top and side walls are particularly pleasing and attractive, and the same are of ornamental value, as well as having great utility. The same makes any open or touring car suitable for use in every kind of weather. The detachable closures are of such strength and rigidity, although of light weight, that they do not rattle, nor is it possible for them to work loose while driving. While I have particularly illustrated the construction embodied in a car having two doors on each side, it is obvious that by varying the size and shape of the panels, that the construction may be embodied in practically any type of automobile.

In Figure 9, I have illustrated a container 70, carried from the top part 69, the same in this case being provided with a door 71, or closure, at one side, and shelves or the like 72 arranged in the receptacle. In this case only the side 71 is hinged. It might be mentioned in the construction illustrated in Figures 2 and 3, the front edge of the closure may be hinged, or the same constructed so that a portion may be turned down similar to 71, so that the closure need not be opened quite so far in order to conveniently insert or remove the side walls. In Figure 10, 75 represents the top, which is shown with an outwardly projecting portion 73 forming a receptacle to which is secured the closure part 74, which is in the form of a receptacle, and corresponds with the closures shown in Figure 2.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

In a device of the kind described and in combination, a rigid vehicle top having cross bars extending transversely across the same from side to side and a pair of spaced bars extending lengthwise the top and connecting two of the transverse bars adjacent the rear of the driver's seat, a curtain container comprising a box shaped receptacle of a size to receive the curtains flat without folding and constructed to fit the enclosure formed by said cross bars and spaced bars and abut the bars, said box shaped receptacle hinged at its rear edge to the rear transverse bar and provided with locking means at the front edge for securing the same to the forward transverse bar, a plurality of fabric curtain separators secured to the inside of the front edge of the receptacle with the remainder of the edges free, and means for limiting the opening movement of the receptacle to less than an arc of 45°.

In testimony whereof, I have hereunto signed my name in the presence of two subscribing witnesses.

OLLIE L. HERRON.

Witnesses:
 Roy W. Hill,
 Bertha Hartmann.